(12) United States Patent
Noble et al.

(10) Patent No.: US 12,053,825 B2
(45) Date of Patent: Aug. 6, 2024

(54) METHOD AND COMPOSITIONS FOR MODIFYING AN ADDITIVELY MANUFACTURED METAL OR METAL-ALLOY OBJECT

(71) Applicant: PostProcess Technologies, Inc., Buffalo, NY (US)

(72) Inventors: Matthew J. Noble, Lancaster, NY (US); Daniel Joshua Hutchinson, Orchard Park, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 0 days.

(21) Appl. No.: 17/620,668

(22) PCT Filed: Jun. 18, 2020

(86) PCT No.: PCT/US2020/038482
§ 371 (c)(1),
(2) Date: Dec. 17, 2021

(87) PCT Pub. No.: WO2020/257488
PCT Pub. Date: Dec. 24, 2020

(65) Prior Publication Data
US 2022/0241864 A1    Aug. 4, 2022

Related U.S. Application Data

(60) Provisional application No. 62/863,180, filed on Jun. 18, 2019.

(51) Int. Cl.
*B22F 3/24* (2006.01)
*B22F 10/62* (2021.01)
*B33Y 40/20* (2020.01)

(52) U.S. Cl.
CPC ............... *B22F 3/24* (2013.01); *B22F 10/62* (2021.01); *B33Y 40/20* (2020.01); *B22F 2998/10* (2013.01)

(58) Field of Classification Search
None
See application file for complete search history.

(56) References Cited

U.S. PATENT DOCUMENTS

| 2018/0016528 | A9 | 1/2018 | Steele et al. |
| 2019/0176403 | A1 | 6/2019 | Hutchinson |
| 2019/0322898 | A1* | 10/2019 | Hutchinson ............ B33Y 40/00 |

FOREIGN PATENT DOCUMENTS

| CN | 104786161 A | 7/2015 |
| DE | 4039479 A1 | 6/1992 |

(Continued)

OTHER PUBLICATIONS

Office Action from Japanese Patent Application No. 2021-574284, dated Apr. 18, 2024, 2 pages.

*Primary Examiner* — Colin W. Slifka
(74) *Attorney, Agent, or Firm* — Lempia Summerfield Katz LLC

(57) ABSTRACT

Methods using formulations for processing a manufactured metal or metal-alloy object, in particular a metal or metal-alloy object manufactured by an additive manufacturing process, are disclosed. Methods, systems and equipment for using the formulations to remove excess materials from the surface, remove support materials, and/or modify the surface of a metal or metal-alloy manufactured object are also disclosed.

5 Claims, 1 Drawing Sheet

(56) References Cited

FOREIGN PATENT DOCUMENTS

| JP | 2005-263854 A | 9/2005 |
|---|---|---|
| WO | 2017/087944 A1 | 5/2017 |
| WO | 2018026448 A1 | 2/2018 |

\* cited by examiner

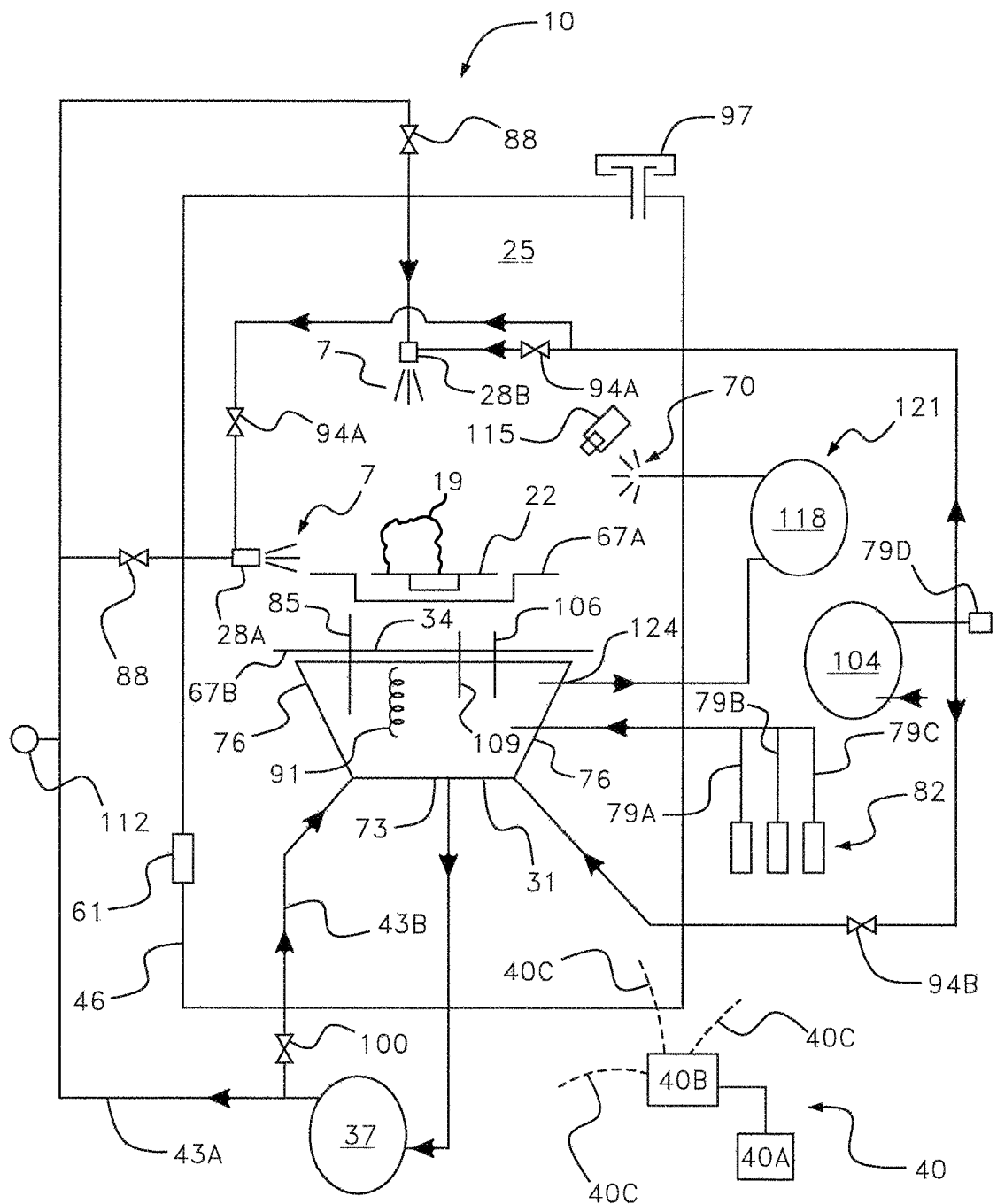

METHOD AND COMPOSITIONS FOR MODIFYING AN ADDITIVELY MANUFACTURED METAL OR METAL-ALLOY OBJECT

CROSS-REFERENCE TO RELATED APPLICATION

This application claims the benefit of U.S. Provisional Patent Application No. 62/863,180, filed Jun. 18, 2019, which is incorporated herein by reference.

FIELD OF THE INVENTION

This disclosure relates generally to processes using formulations for removing material from or finishing metal objects or metal alloy objects made by additive manufacturing processes, as well as systems, machines and methods for using such formulations.

BACKGROUND OF THE INVENTION

Additive manufacturing (AM) of metal and metal alloy parts has advantages over traditional manufacturing methods. Designs of metal objects or metal alloy objects that would have been limited by geometry restrictions or that would have incurred extensive mold, fixture, and labor costs, can be made with more design freedom to high standards using a wide range of metal powders. While prototyping metals with AM technologies has proven valuable, AM can also be used for the production of components for demanding applications in aerospace, medical, dental, and industrial industries.

Current AM technologies for metal parts include powder bed systems such as DMLS (direct metal laser sintering), EBM (electron beam melting), and SLM (selective laser melting), or powder feed systems such as LC (laser cladding), LMD (laser metal deposition) and DMD (direct metal deposition). Across each of these technologies, some of the most popular alloys being additively manufactured today include variations of titanium, aluminum, stainless steel (304, 316), carbon steel, nickel super-alloys (i.e. Inconel 718, Haynes 282, Hastelloy) (aerospace), AlSi10Mg (aerospace), Ti6Al4V (medical), and CoCr (dental).

Although AM has many advantages for many applications, one of the factors to be addressed is processing the part after it has been formed by the printer. Different AM print technologies and materials can present different post-printing challenges. Some of these challenges include, but are not limited to:
  removing unwanted metal powder
  removing unwanted print material
  removing unwanted support material
  reducing the surface roughness
  removing oxidized surface material
  improving the luster of the part
  passivating the surface
  relieving stress.

Current methods for processing metal and metal alloy parts range from mechanical methods such as machining, hand sanding, blasting, tumbling, abrading, and electro polishing to chemical surface treatments like descaling and pickling. These methods are time-consuming, relatively expensive, require relatively large amounts of manual labor, or require the use of hazardous chemicals.

Although these prior processing methods are satisfactory for some applications, there is room for improvements. In particular, there exists a need for an effective method for processing metal objects or metal alloy objects produced by AM methods that removes support material from as well as surface finishes metal or alloy object produced by AM methods.

SUMMARY

The inventive concepts disclosed herein include a formulation comprised of one or more organic acids and solid abrasive media, and a method for applying the formulation. The formulation and method are used to remove material or modify the surface of AM metallic objects, including metal and metal-alloy objects. For example, the formulation is applied in a chamber capable of wet blasting the AM object with the formulation to remove undesired metal or metal alloy material. Use of the formulation may be carried out at specified temperatures, pressures, spray nozzle motion, and various types of spray nozzles may be used, and different distances between the spray nozzle and the object, so as to achieve a desired modification of the surface of AM objects.

Types of AM. The inventive concepts disclosed herein may be applied to modify surfaces of objects made by various AM processes, such as powder bed systems such as EBM (Electron Beam Melting), DMLS (Direct Metal Laser Sintering), and SLM (Selective Laser Melting) or powder feed systems such as LC (Laser Cladding), LMD (Laser Metal Deposition), and DED (Directed Energy Deposition).

Support material removal. Some metal objects or metal alloy objects produced by AM methods include support material. The inventive concepts disclosed herein may be applied for removal of undesired support material printed to support certain structures of an AM metal object or metal alloy object.

Surface roughness. Another aspect of the invention is directed to reducing the surface roughness of a metal object or metal alloy object manufactured by an AM process. AM metal and metal-alloy objects may have a rough surface finish (measured as Ra in microinches or micrometers). The inventive concepts disclosed herein may be utilized to reduce the surface roughness of an AM metal or metal-alloy object from an as-manufactured Ra of 400+ microinches to an Ra as low as 10 microinches, or to a desired roughness.

Surface finish. The inventive concepts disclosed herein may be utilized to modify the surface finish of an object manufactured via an AM process. In some application, surfaces of AM metal and metal-alloy objects may oxidize as a dark gray to black. The inventive concepts disclosed herein may be used to remove the oxidized layer from the metal or metal-alloy, partially passivate the object, and leave the object with a lustrous metallic-looking surface finish.

Structural integrity. In addition, the inventive concepts disclosed herein may be used to improve the structural integrity and strength of an object manufactured via an AM process. AM metal and metal-alloy objects may have mechanical properties that may be less than optimal due to stress concentrations on the surface. Embodiments of the inventive concepts may be used to relieve stress concentrations in the metal or metal-alloy surface.

BRIEF DESCRIPTION OF THE DRAWINGS

FIG. 1 is a schematic representation of a system that may be used to apply a formulation that is in keeping with the invention to an additively manufactured object. A list of the features shown in FIG. 1 is:

7 sprayable fluid
10 apparatus
19 additively manufactured-part
22 turntable
25 spraying chamber
28 nozzles
31 tank
34 upper side
37 media pump
40 human-machine interface ("HMI")
43 fluid conduits
46 housing
61 fan
67 grates
70 clean-in-place ("CIP") nozzle
73 outlet
76 sloping sides
79 ports
82 dosing mechanism
85 liquid level sensor
88 valves
91 heater
94 valves
97 vent
100 valve
104 air pump
106 pH sensor
109 temperature sensor
112 pressure sensor
115 camera
118 CIP pump
121 CIP system
124 CIP inlet

DETAILED DESCRIPTION

The following detailed description describes examples of the invention and inventive concepts. It should be understood that other embodiments may be realized and that various changes to the invention may be made without departing from the spirit and scope of the invention. Thus, the following more detailed description of certain embodiments of the invention is not intended to limit the scope of the invention, but is presented for purposes of illustration, and to describe features and characteristics that may be part of the invention or inventive concepts.

As used herein, unless otherwise indicated, the term "finishing" refers to removing undesired material from an AM object after the stage at which the object has been printed so as to produce a finished object. Finishing can include one or more processes, including, but not limited to, removing undesired metal powder, removing undesired print material, removing undesired support material, reducing the surface roughness, removing oxidized surface material, improving the luster of the object, passivating the surface, and/or relieving stresses in the AM object. For AM objects, "finishing" may also be referred to as "cleaning," "surface modification," "polishing," "grinding," "milling," "smoothing," or "texturizing."

In this disclosure, as used herein, unless otherwise indicated, the term "formulation" refers to a fluidic composition, which may include a fluid, slurry, mixture, colloid, suspension, chemical, liquid, detergent or solution. Any of these terms may be used to refer to the inventive concepts disclosed herein.

Ranges of values are disclosed herein. The ranges set out a lower limit value ("LLV") and an upper limit value ("ULV"). Unless specified otherwise, the LLV, ULV, and all values between the LLV and ULV are part of the range.

The inventive concepts disclosed herein include formulations, as well as methods and systems that use the formulations, for removing support material or modifying the surface of an AM metal object or metal alloy object. The inventive concepts may be implemented to remove or modify metal or metal alloy material such as surface material, support structure material, or oxidized surface layers from objects made via an AM process.

Metals and metal alloys to which the inventive concepts may be applied include, but are not limited to, one or more of the following: titanium, Ti6Al4V, aluminum, AlSi10Mg, Al 6061, tool steels such as H13 and cermets, super alloys of Inconel 625, 718, Stellite, stainless steels such as BC4, 304L, 316, 320, refractory materials such as MoRe, Ta—W, CoCr, and the like.

Additionally, the inventive concepts including methods may be carried out at specified temperatures and/or pressures, by using a desired spray nozzle motion, various types of spray nozzles, and/or by varying a distance from the nozzle to the object so as to modify and achieve certain desired characteristics for a surface of an AM object.

The formulations according to the inventive concepts include organic compounds with acidic properties, such as compounds having a carboxylic acid group, organic-based alcohols where the hydroxyl can act as a weak acid, the enol group, and the phenol group (i.e. phenolic acid). The following are examples of compounds having acidic properties that may be used: formic acid, acetic acid, propionic acid, butyric acid, valeric acid, caproic acid, oxalic acid, lactic acid, malic acid, citric acid, ascorbic acid, benzoic acid, carbonic acid, glycine, sarcosine, glycolic acid, phenolic acid, uric acid, taurine, p-toluenesulfonic acid, trifluoromethanesulfonic acid, aminomethylphosphonic acid, maleic acid, succinic acid, palmitic acid, itaconic acid, fumaric acid, tartaric acid, and boric acid. One or more organic acids can be present in the colloidal mixture from 0.01% up to 50.00% of the total weight of the mixture.

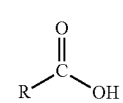

Carboxyl Group

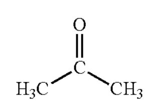

Enol Group

Phenol Group

According to the inventive concepts, the formulations include solid media. The solid media provide mechanical abrasion to facilitate the finishing process. The solid media may be composed of different materials, different shapes, and/or different sizes. The solid media may be selected from the following types: glass beads, steel, stainless steel, ceramic materials, aluminum oxide/alumina, silica, zirconium, silicon carbide, plastic, garnet, copper, corn cob, walnut shells, mica, feldspar, pumice, and the like, and combinations thereof. The following shapes for the solid media may be used: round, oblong, irregular, jagged, angular, cubic, rectangular, and/or cylindrical. The solid media may have the following dimensions: a longest linear diameter of 0.1 µm (micrometers) to 1000 µm (micrometers), including all 0.1 µm values and ranges therebetween.

First Embodiment

In this first embodiment, a formulation according to the inventive concepts may be used to finish parts of Inconel 718. Inconel 718 (55Ni-21Cr-5Nb-3Mo) is a Ni-based superalloy. This superalloy is precipitation hardened to maintain high strength and good ductility. Inconel 718 is non-magnetic, maintains good corrosion and oxidation resistance, and is used for parts requiring high resistance to deformation and stress cracking up to 1300° F. (704° C.) and oxidation resistance up to 1800° F. (982° C.). Conventional methods for finishing AM produced Inconel 718 use chemicals such as hydrofluoric acid (HF) or aqua regia (HCl/$HNO_3$).

In one embodiment, the formulation was applied using a DECI Duo system. The DECI Duo system is available from PostProcess Technologies, Inc. FIG. 1 is a schematic representation of an embodiment of such a system 10. The machine hardware portion of the DECI Duo system includes a spraying chamber 25 in which are located two single axis jets 28A, 28B that emit compressed air and formulation (detergent and suspended solids) 7 at variable software-regulated pressures and rates. Located in the chamber 25 is a t-slotted 360 degree rotating turntable 22 designed for the flexible fixturing. The rotation of the table 22 provides for a third axis of motion, providing maximum surface exposure for the parts 19 being processed.

In this embodiment, the DECI Duo system applies the formulation using Thermal Atomized Fusillade (TAF) technology developed by PostProcess Technologies, Inc. The DECI Duo system and Thermal Atomized Fusillade (TAF) technology are described in copending patent application Ser. No. 16/209,778, filed Dec. 4, 2018, entitled "Method And Apparatus For Surface Finishing And Support Material Removal," the entire disclosure of which is incorporated by reference herein. The part 19 needing removal of support material and/or smoothing of surfaces of build material may be placed on the turntable 22. A media pump 37 draws the fluid 7 from a tank 31 having an open upper side 34 situated below the turntable 22 and then delivers the fluid 7 through conduits 43A, to the nozzles 28, which, together with forced air, causes the fluid 7 to spray at the part 19. The fluid 7 then collects back into the tank 31 after being sprayed at the part 19. When used in the PostProcess DECI Duo system, the process is software controlled through the PostProcess AUTOMAT3D® platform. The AUTOMAT3D programming platform is described in copending patent applications, Ser. No. 16/340,647, filed Apr. 9, 2019 and Ser. No. 16/348,276, filed May 8, 2019, the entire disclosures of which are incorporated by reference herein.

The specific component ingredients of a formulation may be related to the metal being finished and the desired finish. Accordingly, the formulation in this embodiment was based on the physical and chemical properties of Inconel 718 as well as the desired etching, passivating and polishing needs. The formulation was a mildly acidic detergent solution comprised of 2% by weight oxalic acid. The formulation complimented the surface finishing process with etching of the part's surface while being devoid of the hazardous drawbacks associated with conventional chemistries. The formulation etched the surface of the part as a first step to the finish. The suspended solids utilized in TAF technology were then able to effectively abrade the surface of the part. If a user's goal is a relatively smooth surface, the process can be stopped there. However if a user wishes to make the part smoother, a second finishing step can be done.

In this embodiment, the media in the formulation was a ceramic zirconia based aggregate sized at 425 µm. This media was selected taking into account layer thickness and hardness associated with DMLS printing of Inconel 718. Zirconia has a high toughness, which makes it suitable for an alloy with high hardness such as Inconel. The size of the media particles, 425 µm, correlates with the surface roughness created by the ranges of layer thicknesses associated with DMLS. Additionally the media is chemically inert, providing the advantage that it does not contaminate the part or formulation. Using this formulation applied with TAF technology allows the part to be finished at lower thermal energies, mitigating the risk of affecting the grain structure of the part.

One of the advantages of using the DECI Duo system to apply the formulation is the AUTOMAT3D programming platform on the DECI Duo. The AUTOMAT3D programming can implement agitation algorithms designed specifically for metal properties that allow the DECI Duo system to take a predictive approach when finishing AM metal parts. The software controls the speed of the nozzle movements, the temperature the process operates at, and air and liquid pressure throughout the duration of the cycle to provide the chemical and mechanical energy sources efficiently. Sensors monitor the process and auto-adjust in real time to provide the energy levels that stay in predetermined ranges. The AUTOMAT3D platform programming also allows users to digitally retool the parameters, creating flexibility for a range of finishing requirements. The settings can be stored for shortened machine prep and repeatability. Additionally, the AUTOMAT3D programming keeps track of run time allowing for software scheduled preventive maintenance, in turn reducing downtime.

This embodiment included several rounds of testing with parts of different geometries, starting roughness and end roughness in order to deliver a data set. Different agitation algorithms were used. The desired outcome included reduced surface roughness and polishing, meant to increase the luster of the part. Reducing the surface roughness created by layer thickness required elevated temperatures along with liquid and pressures. These elevated ranges increased the mechanical energy in the system resulting in a rapid rate of removal. In this embodiment, the acidic nature of the formulation reacted with the surface layer of the part passivating it to some extent. The outcome of this process was a reduction of surface roughness, a reduction or elimination of print layer lines, a more corrosion resistant surface finish, and a more lustrous part.

In this embodiment, the results were measured using a profilometer. Roughness values depended on direction and surface of the part being measured. The measurements were taken in the direction perpendicular to the print layers. The following table includes examples of the start and finish surface roughness measurements as well as the coinciding operator and machine time requirements for the results achieved.

|  | Start $R_a$ | End $R_a$ | % $R_a$ Reduction | Operator Time | Machine Cycle Time |
| --- | --- | --- | --- | --- | --- |
| CASE 1: | 623 µin (15.8 µm) | 73 µin (1.85 µm) | 88% | 5 min | 3 hrs. |
| CASE 2: | 138 µin (3.5 µm) | 39 µin (0.99 µm) | 72% | 7 min | 1.75 hrs. |

-continued

|  | Start $R_a$ | End $R_a$ | % $R_a$ Reduction | Operator Time | Machine Cycle Time |
|---|---|---|---|---|---|
| CASE 3: | 228 μin (5.8 μm) | 100 μin (2.5 μm) | 57% | 5 min | 3 hrs. |
| CASE 4: | 200 μin (15.8 μm) | 80 μin (1.85 μm) | 60% | 5 min | 0.25 hrs. |
| CASE 5: | 315 μin (8 μm) | 71 μin (1.8 μm) | 77% | 5 min | 0.8 hrs. |

Examples

The following examples are presented to illustrate certain various alternatives. However, these examples are not intended to limit the scope of the inventive concepts in any way. In the following examples, the objects were finished in a PostProcess DECI Duo machine. The amount of time to obtain the results varied depending on the materials and desired finished smoothness.

EXAMPLE 1. A colloidal mixture of 2% by weight oxalic acid, 30-40 pounds of round zirconium oxide, $ZrO_2$, 400-600 micrometers in size, and 40 gallons of water in a wet blasting chamber may be used to modify the surface of AlSi10Mg alloy created by an additive manufacturing process. Surface finishing of the AlSi10Mg alloy may be carried out with the temperature of the spraying chamber maintained within the range of temperatures from 70° F. (21° C.) to 140° F. (60° C.) and a pressure from 0 to 80 psig. Using such a colloidal mixture, the surface roughness of the AlSi10Mg alloy may be changed from an Ra of 200-300 microinches to an Ra of less than 70 microinches. The finished object may be metallic looking with luster, and may show no visible signs of oxidation on the surface.

EXAMPLE 2. A colloidal mixture of 2% by weight oxalic acid, 30-40 pounds of round zirconium oxide, $ZrO_2$, 100-300 micrometers in size, and 40 gallons of water in a wet blasting chamber may be used to modify the surface of AlSi10Mg alloy created by an additive manufacturing process. Surface finishing of the AlSi10Mg alloy may be carried out with the spraying chamber maintained in the range of temperatures from ambient 70° F. (21° C.) to 140° F. (60° C.) and a pressure from 0 to 80 psig. Using such a colloidal mixture, the surface roughness of the AlSi10Mg alloy may be changed from an Ra of 200-300 microinches to an Ra of less than 100-150 microinches. The finished object may be metallic looking with luster, and may show no visible signs of oxidation on the surface.

EXAMPLE 3. A colloidal mixture of 1% by weight oxalic acid and 1% by weight citric acid, 30-40 pounds of round zirconium oxide, $ZrO_2$, 400-600 micrometers in size, and 40 gallons of water in a wet blasting chamber may be used to modify the surface of AlSi10Mg alloy created by an additive manufacturing process. Surface finishing of the AlSi10Mg alloy may be carried out with the spraying chamber maintained in the range of temperatures from ambient 70° F. (21° C.) to 140° F. (60° C.) and a pressure from 0 to 80 psig. Using such a mixture, the surface roughness of the AlSi10Mg alloy may be changed from an Ra of 200-300 microinches to an Ra of less than 100-150 microinches. The finished object may be metallic looking with luster, and may show no visible signs of oxidation on the surface.

EXAMPLE 4. A colloidal mixture of 1% by weight ascorbic acid and 1% by weight citric acid, 30-40 pounds of round zirconium oxide, $ZrO_2$, 400-600 micrometers in size, and 40 gallons of water in a wet blasting chamber may be used to modify the surface of AlSi10Mg alloy created by an additive manufacturing process. Surface finishing of the AlSi10Mg alloy may be carried out with the spraying chamber maintained in the range of temperature from ambient 70° F. (21° C.) to 140° F. (60° C.) and a pressure from 0 to 80 psig. Using such a mixture, the surface roughness of the AlSi10Mg alloy may be changed from an Ra of 200-300 microinches to an Ra of less than 100-150 microinches. The finished object may be metallic looking with luster, and may show no visible signs of oxidation on the surface.

EXAMPLE 5. A colloidal mixture of 1% by weight oxalic acid and 0.2% by weight benzoic acid, 30-40 pounds of round zirconium oxide, $ZrO_2$, 400-600 micrometers in size, and 40 gallons of water in a wet blasting chamber may be used to modify the surface of AlSi10Mg alloy created by an additive manufacturing process. Surface finishing of the AlSi10Mg alloy may be carried out with the spraying chamber maintained in the range of temperature from ambient 70° F. (21° C.) to 140° F. (60° C.) and a pressure from 0 to 80 psig. Using such a mixture, the surface roughness of the AlSi10Mg alloy may be changed from an Ra of 200-300 microinches to an Ra of 80-120 microinches. The finished object may be metallic looking with luster, and may show no visible signs of oxidation on the surface.

EXAMPLE 6. A colloidal mixture of 1% by weight oxalic acid and 1.0% by weight tartaric acid, 30-40 pounds of round zirconium oxide, $ZrO_2$, 400-600 micrometers in size, and 40 gallons of water in a wet blasting chamber may be used to modify the surface of AlSi10Mg alloy created by an additive manufacturing process. Surface finishing of the AlSi10Mg alloy may be carried out with the spraying chamber maintained in the range of temperature from ambient 70° F. (21° C.) to 140° F. (60° C.) and a pressure from 0 to 80 psig. Using such a mixture, the surface roughness of the AlSi10Mg alloy may be changed from an Ra of 200-300 microinches to an Ra of 80-120 microinches. The finished object may be metallic looking with luster, and may show no visible signs of oxidation on the surface.

EXAMPLE 7. A colloidal mixture of 2% by weight oxalic acid, 30-40 pounds of round zirconium oxide, $ZrO_2$, 400-600 micrometers in size, and 40 gallons of water in a wet blasting chamber may be used to modify the surface of Ti6Al4V alloy created by an additive manufacturing process. Surface finishing of the Ti6Al4V alloy may be carried out with the spraying chamber maintained in the range of temperature from ambient 70° F. (21° C.) to 140° F. (60° C.) and a pressure from 0 to 78 psig. Using such a mixture, the surface roughness of the Ti6Al4V alloy may be changed from an Ra of 200-300 microinches to an Ra of 100-150 microinches. The finished object may be metallic looking with luster, and may show no visible signs of oxidation on the surface.

EXAMPLE 8. A colloidal mixture of 1% by weight oxalic acid, 1% by weight ascorbic acid, 30-40 pounds of round zirconium oxide, $ZrO_2$, 400-600 micrometers in size, and 40 gallons of water in a wet blasting chamber may be used to modify the surface of Ti6Al4V alloy created by an additive manufacturing process. Surface finishing of the Ti6Al4V alloy may be carried out with the spraying chamber maintained in the range of temperature from ambient 70° F. (21° C.) to 140° F. (60° C.) and a pressure from 0 to 80 psig. Using such a mixture, the surface roughness of the Ti6Al4V alloy may be changed from an Ra of 200-300 microinches to an Ra of less than 120 microinches. The finished object may be metallic looking with luster, and may show no visible signs of oxidation on the surface.

EXAMPLE 9. A colloidal mixture of 1% by weight oxalic acid, 1% by weight citric acid, 30-40 pounds of round zirconium oxide, $ZrO_2$, 400-600 micrometers in size, and 40 gallons of water in a wet blasting chamber may be used to modify the surface of Ti6Al4V alloy created by an additive manufacturing process. Surface finishing of the Ti6Al4V alloy may be carried out with the spraying chamber maintained in the range of temperature from ambient 70° F. (21° C.) to 140° F. (60° C.) and a pressure from 0 to 80 psig. Using such a mixture, the surface roughness of the Ti6Al4V alloy may be changed from an Ra of 200-300 microinches to an Ra of less than 120 microinches. The finished object may be metallic looking with luster, and may show no visible signs of oxidation on the surface.

EXAMPLE 10. A colloidal mixture of 1% by weight oxalic acid, 1% by weight benzoic acid, 30-40 pounds of round zirconium oxide, $ZrO_2$, 400-600 micrometers in size, and 40 gallons of water in a wet blasting chamber may be used to modify the surface of Ti6Al4V alloy created by an additive manufacturing process. Surface finishing of the Ti6Al4V alloy may be carried out with the spraying chamber maintained in the range of temperature from ambient 70° F. (21° C.) to 140° F. (60° C.) and a pressure from 0 to 80 psig. Using such a mixture, the surface roughness of the Ti6Al4V alloy may be changed from an Ra of 200-300 microinches to an Ra of less than 120 microinches. The finished object may be metallic looking with luster, and may show no visible signs of oxidation on the surface.

EXAMPLE 11. A colloidal mixture of 2% by weight oxalic acid, 35 pounds of round zirconium oxide, $ZrO_2$, 400-600 micrometers in size, and 40 gallons of water in a wet blasting chamber may be used to modify the surface of Inconel 718 alloy created by an additive manufacturing process. Surface finishing of the Inconel 718 alloy may be carried out with the spraying chamber maintained in the range of temperature from ambient 80° F. (21° C.) to 140° F. (60° C.) and a pressure from 50 psig to 100 psig. Using such a mixture, the surface roughness of the Inconel 718 alloy may be changed from an Ra of 150-250 microinches to an Ra of less than 75 microinches. The finished object may be metallic looking with a luster, and may show no visible signs of oxidation on the surface.

EXAMPLE 12. A colloidal mixture of 4% by weight oxalic acid, 35 pounds of round zirconium oxide, $ZrO_2$, 400-600 micrometers in size, and 40 gallons of water in a wet blasting chamber may be used to modify the surface of Inconel 718 alloy created by an additive manufacturing process. Surface finishing of the Inconel 718 alloy may be carried out with the spraying chamber maintained in the range of temperature from ambient 80° F. (21° C.) to 140° F. (60° C.) and a pressure from 50 psig to 100 psig. Using such a mixture, the surface roughness of the Inconel 718 alloy may be changed from an Ra of 150-250 microinches to an Ra of less than 75 microinches. The finished object may be metallic looking with a luster, and may show no visible signs of oxidation on the surface.

EXAMPLE 13. A colloidal mixture of 1% by weight oxalic acid and 1.0% by weight tartaric acid, 30-40 pounds of round zirconium oxide, $ZrO_2$, 400-600 micrometers in size, and 40 gallons of water in a wet blasting chamber may be used to modify the surface of Inconel 718 alloy created by an additive manufacturing process. Surface finishing of the Inconel 718 alloy may be carried out with the spraying chamber maintained in the range of temperature from ambient 70° F. (21° C.) to 140° F. (60° C.) and a pressure from 0 to 80 psig. Using such a mixture, the surface roughness of the Inconel 718 alloy may be changed from an Ra of 150-200 microinches to an Ra less than 75 microinches. The finished object may be metallic looking with luster, and may show no visible signs of oxidation on the surface.

EXAMPLE 14. A colloidal mixture of 1% by weight oxalic acid and 1.0% by weight benzoic acid, 30-40 pounds of round zirconium oxide, $ZrO_2$, 400-600 micrometers in size, and 40 gallons of water in a wet blasting chamber may be used to modify the surface of Inconel 718 alloy created by an additive manufacturing process. Surface finishing of the Inconel 718 alloy may be carried out with the spraying chamber maintained in the range of temperature from ambient 70° F. (21° C.) to 140° F. (60° C.) and a pressure from 0 to 80 psig. Using such a mixture, the surface roughness of the Inconel 718 alloy may be changed from an Ra of 150-200 microinches to an Ra less than 75 microinches. The finished object may be metallic looking with luster, and may show no visible signs of oxidation on the surface.

EXAMPLE 15. A colloidal mixture of 1% by weight ascorbic acid and 1.0% by weight citric acid, 30-40 pounds of round zirconium oxide, $ZrO_2$, 400-600 micrometers in size, and 40 gallons of water in a wet blasting chamber may be used to modify the surface of Inconel 718 alloy created by an additive manufacturing process. Surface finishing of the Inconel 718 alloy may be carried out with the spraying chamber maintained in the range of temperature from ambient 70° F. (21° C.) to 140° F. (60° C.) and a pressure from 0 to 80 psig. Using such a mixture, the surface roughness of the Inconel 718 alloy may be changed from an Ra of 150-200 microinches to an Ra less than 75 microinches. The finished object may be metallic looking with luster, and may show no visible signs of oxidation on the surface.

EXAMPLE 16. A colloidal mixture of 2% by weight oxalic acid, 35 pounds of round zirconium oxide, $ZrO_2$, 400-600 micrometers in size, and 40 gallons of water in a wet blasting chamber may be used to modify the surface of Aluminum F357 alloy created by an additive manufacturing process. Surface finishing of the Aluminum F357 alloy may be carried out with the spraying chamber maintained in the range of temperature from ambient 80° F. (21° C.) to 140° F. (60° C.) and a pressure from 50 psig to 100 psig. Using such a mixture, the surface roughness of the Aluminum F357 alloy may be changed from an Ra of 150-250 microinches to an Ra of less than 75 microinches. The finished object may be metallic looking with a luster, and may show no visible signs of oxidation on the surface.

EXAMPLE 17. A colloidal mixture of 2% by weight oxalic acid, 35 pounds of round zirconium oxide, $ZrO_2$, 400-600 micrometers in size, and 40 gallons of water in a wet blasting chamber may be used to modify the surface of 316 stainless steel created by an additive manufacturing process. Surface finishing of the 316 stainless steel may be carried out with the spraying chamber maintained in the range of temperature from ambient 80° F. (21° C.) to 140° F. (60° C.) and a pressure from 50 psig to 100 psig. Using such a mixture, the surface roughness of the 316 stainless steel was changed from an Ra of 300-350 microinches to an Ra of 50-100 microinches. The finished object may be metallic looking with a luster, and may show no visible signs of oxidation on the surface.

In some of the embodiments disclosed above, formulations of the AM metal and metal alloy finishing compositions were described as being used in a DECI Duo system. However, the AM formulations are not limited to use only in a DECI Duo system. In alternatives, machines other than the PostProcess DECI Duo may be used with any of the disclosed formulations. Such alternative machines or systems may include simple enclosed chambers in which metal or metal alloy parts may be sprayed manually (e.g., by an attendant or human operator). Alternatively, the AM finishing formulations may be used in enclosed chambers in which parts may be mounted and sprayed unattended for a period of time. The amount of time to obtain the desired results depends on the type of machine being used, including the number of spray nozzles and dimensions of the chamber. Spraying may take place for minutes, hours or days to achieve the desired AM part characteristics.

In further alternatives, the formulations disclosed herein may be used for processing metal objects or metal alloy objects that were manufactured by processes other than additive manufacturing. For example, processing formulations disclosed herein may be used for finishing metal objects or metal alloy objects that were manufactured by traditional manufacturing processes, such as casting or molding. When used for processing metal or metal alloy parts manufactured by means other than additive manufacturing, the formulations may be applied using any of the systems, hardware, or machines disclosed above, including a DECI Duo system or a conventional washing chamber.

In one embodiment, the formulation is provided as separate components of organic acid (neat, undiluted, or in concentrate form) and solid media, which are mixed with water (if needed) prior to use. In an alternative, the organic acid component of the formulation is provided as a concentrate which is mixed with an appropriate proportion of water prior to use. In yet another alternative, the organic acid component of the formulation is provided as a powder which is added to water in an appropriate proportion prior to use. In yet another alternative embodiment, the formulation including the organic acid, solid media, and water, is provided entirely or partially premixed. In yet another alternative, the organic acid component of the formulation is provided, as a concentrate, powder, or premixed solution, and an appropriate solid media is chosen and used.

Now that features of the invention and some embodiments of the invention have been described, Statements (non-limiting) of various embodiments of the invention are as follows:

Statement A: A sprayable formulation for finishing a metallic object made by an additive manufacturing process comprising:
0.01% to 50% by weight of at least one organic acid;
0.01% to 50% by weight of solid media; and
water (e.g., the remainder is water).

Statement B: The sprayable formulation of Statement A, wherein the at least one organic acid is chosen from formic acid, acetic acid, propionic acid, butyric acid, valeric acid, caproic acid, oxalic acid, lactic acid, malic acid, citric acid, ascorbic acid, benzoic acid, carbonic acid, glycine, sarcosine, glycolic acid, phenolic acid, uric acid, taurine, p-toluenesulfonic acid, trifluoromethanesulfonic acid, aminomethylphosphonic acid, maleic acid, succinic acid, palmitic acid, itaconic acid, fumaric acid, tartaric acid, boric acid, and the like, and combinations thereof.

Statement C: The sprayable formulation of Statement A or Statement B, wherein the solid media is chosen from glass beads, steel, stainless steel, ceramic materials, aluminum oxide/alumina, silica, zirconium, silicon carbide, plastic, garnet, copper, corn cob, walnut shells, mica, feldspar, pumice, and the like, and combinations thereof.

Statement D: The sprayable formulation of Statement A, or Statement B, or Statement C, wherein the solid media has a shape, texture, and/or surface that is round, oblong, irregular, jagged, angular, cubic, rectangular, cylindrical, and combinations thereof Statement E: The sprayable formulation of Statement A, or Statement B, or Statement C, or Statement D, wherein the solid media has a size in a range of 0.1 μm (micrometers) to 1000 μm (micrometers), including all 0.1 μm values and ranges therebetween.

Statement F: The sprayable formulation of any of the foregoing Statements, wherein the finishing solution is comprised of a colloidal slurry.

Statement G: The sprayable formulation of any of the foregoing Statements, wherein the metallic object comprises a metal or metal-alloy object.

Statement H: The sprayable formulation of any of the foregoing Statements, wherein the metallic object comprises at least one of titanium, Ti6Al4V, aluminum, AlSi10Mg, Al 6061, tool steels including H13 or cermets, super alloys of Inconel 625, 718, Stellite, stainless steels including BC4, 304L, 316, 320, or refractory materials including MoRe, and Ta—W, CoCr, or combinations thereof Statement I: The sprayable formulation of any of the foregoing Statements, wherein the additive manufacturing process includes powder bed systems including Electron Beam Melting, Direct Metal Laser Sintering, Selective Laser Melting, powder feed systems including Laser Cladding and/or Laser Metal Deposition, and/or Directed Energy Deposition.

Statement J: A method of finishing an additively manufactured metallic object comprising: applying a sprayable formulation to the additively manufactured metallic object, wherein the sprayable formulation comprises 0.01% to 50% by weight of at least one organic acid, 0.01% to 50% by weight of solid media, and water.

Statement K: The method of Statement J further comprising heating a chamber in which the formulation is applied to a temperature from 21° C. to 60° C.

Statement L: The method of Statement J or Statement K further comprising pressurizing a chamber in which the formulation is applied at a pressure from 0 to 80 psig.

Statement M: The method of Statement J, or Statement K, or Statement L further comprising rotating a platform on which the additively manufactured metallic object is located while the formulation is being applied.

Statement N: The method of Statement J, or Statement K, or Statement L, or Statement M, wherein the process of finishing includes at least one of: removing unwanted metal powder from the additively manufactured metallic object, removing unwanted print material from the additively manufactured metallic object, removing unwanted support material from the additively manufactured metallic object, reducing the surface roughness from the additively manufactured metallic object, removing oxidized surface material from the additively manufactured metallic object, improving luster of the additively manufactured metallic object, passivating a surface of the additively manufactured metallic object, or relieving stress from the additively manufactured metallic object.

Statement O: A system for finishing an additively manufactured metallic object, comprising:
an enclosed chamber;
a platform in the enclosed chamber upon which can be positioned the additively manufactured metallic object; and
a spray nozzle located to direct a sprayable formulation at the additively manufactured metallic object positioned on the platform, wherein the sprayable formulation comprises 0.01% to 50% by weight of at least one organic acid, 0.01% to 50% by weight of solid media, and water.

Statement P: A method of providing a sprayable formulation for finishing an additively manufactured metallic object comprising:
provide 0.01% to 50% by weight of at least one organic acid;
adding 0.01% to 50% by weight of solid media to the at least one organic acid; and
optionally, adding water.

Statement Q: The method of Statement P, wherein the at least one organic acid is provided in a concentrate form and the method further comprises adding water to the concentrate form to provide the 0.01% to 50% by weight of the at least one organic acid.

Statement R: The method of Statement P, wherein the at least one organic acid is provided in a powder form and the method further comprises adding water to the powder form to provide the 0.01% to 50% by weight of the at least one organic acid.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art, and these are also intended to be encompassed by the invention. Although embodiments of the invention have been described herein, the invention is not limited to such embodiments. The present invention is deemed limited only by the appended claims and the reasonable interpretation thereof.

What is claimed is:

1. A method of finishing an additively manufactured metallic object comprising applying a sprayable formulation to the additively manufactured metallic object, wherein the sprayable formulation comprises 0.01% to 50% by weight of at least one organic acid, 0.01% to 50% by weight of solid media, and water.

2. The method of claim 1, further comprising heating a chamber in which the formulation is applied to a temperature from 21° C. to 60° C.

3. The method of claim 1, further comprising pressurizing a chamber in which the formulation is applied at a pressure from 0 to 80 psig.

4. The method of claim 1, further comprising rotating a platform on which the additively manufactured metallic object is located while the formulation is being applied.

5. The method of claim 1, wherein the process of finishing includes at least one of: removing unwanted metal powder from the additively manufactured metallic object, removing unwanted print material from the additively manufactured metallic object, removing unwanted support material from the additively manufactured metallic object, reducing the surface roughness from the additively manufactured metallic object, removing oxidized surface material from the additively manufactured metallic object, improving luster of the additively manufactured metallic object, passivating a surface of the additively manufactured metallic object, or relieving stress from the additively manufactured metallic object.

* * * * *